United States Patent [19]

Abler

[11] 4,294,541
[45] Oct. 13, 1981

[54] BI-PERISCOPIC INSTRUMENT FOR USE IN DETERMINING TERRESTRIAL POSITIONS THROUGH CELESTIAL OBSERVATION

[76] Inventor: William L. Abler, 3350 S. Michigan, Chicago, Ill. 60616

[21] Appl. No.: 49,567

[22] Filed: Jun. 18, 1979

[51] Int. Cl.³ .................. G01C 1/00; G01C 1/14; G02B 23/04
[52] U.S. Cl. .................. 356/145; 350/33; 356/146
[58] Field of Search .................. 356/144–147, 356/248, 253–255, 141; 33/268–271, 277; 350/32–34, 50; 250/203 R

[56] References Cited

U.S. PATENT DOCUMENTS

| 914,754 | 3/1909 | Saegmuller | 350/34 |
|---|---|---|---|
| 2,316,466 | 4/1943 | Storer | |
| 2,527,189 | 10/1950 | Kittelson | |
| 2,566,312 | 9/1951 | Cable | |
| 3,046,830 | 7/1962 | Pierce et al. | 356/146 |
| 3,207,025 | 9/1965 | MacDonald | 350/52 |
| 4,083,636 | 4/1978 | Owen | 356/141 |

FOREIGN PATENT DOCUMENTS 474100 3/1929 Fed. Rep. of Germany ........ 33/268
960383 6/1964 United Kingdom .................. 350/33

OTHER PUBLICATIONS

Herrick, S., "Instrumental Solution in Celestial Navigation", Navigation, vol. 1, 6-1946, pp. 22-27.

Primary Examiner—William H. Punter
Attorney, Agent, or Firm—Jacques M. Dulin

[57] ABSTRACT

An instrument having an annular body and a pair of independently and selectively-adjustable periscopes for transmitting the superimposed images of two reference stars (or other selected celestial objects) to a viewer for the purpose of directing orientation of the instrument so that its central axis will be parallel with the polar axis and an identifiable point on the perimeter of its scaled annular body will be directed towards Aries. From such a single sighting, the user obtains nearly all of the information required to compute his own longitude and latitude, the only other information being readily obtainable from an almanac and a timepiece.

9 Claims, 6 Drawing Figures

FIG. I

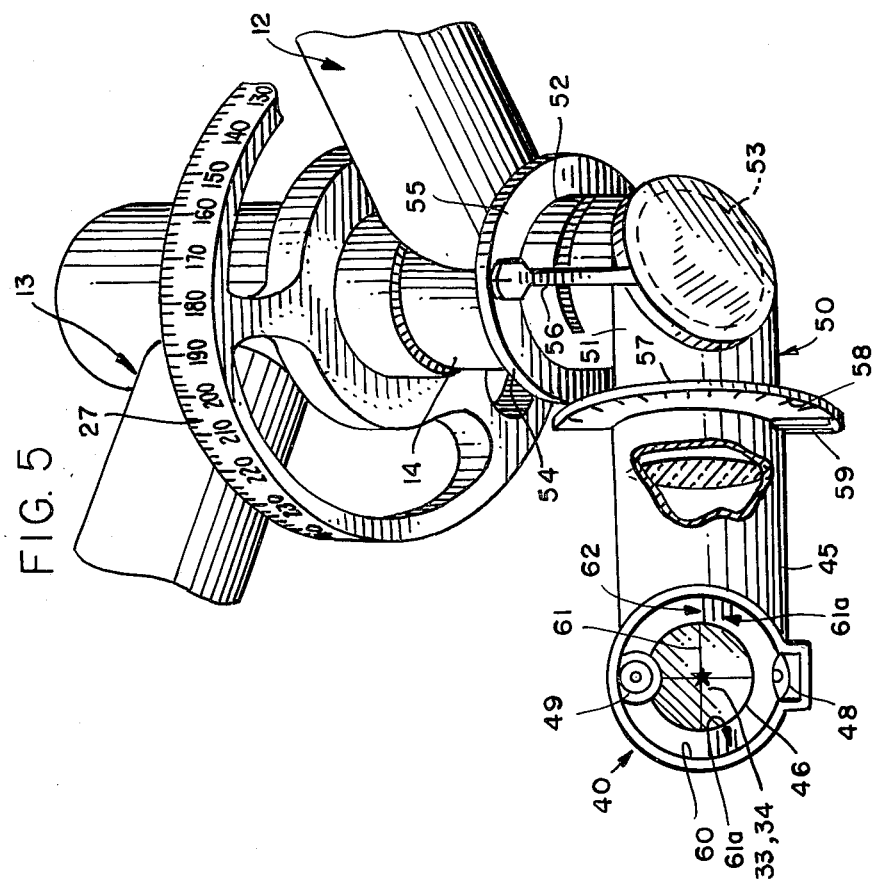

BI-PERISCOPIC INSTRUMENT FOR USE IN DETERMINING TERRESTRIAL POSITIONS THROUGH CELESTIAL OBSERVATION

BACKGROUND

Celestial navigation procedures generally require cumbersome equipment and volumes of source materials in addition to considerable navigational training for their use. For example, plotting boards, charts, and volumes of tables are all commonly needed along with the sextant, transit, or other instruments employed for celestial observation. While the space requirements may not be objectionable on board ship, they may become so where space is at a premium, as on a smaller vessel, in aircraft, or during land exploration. Efforts to develop equipment which requires less space, and which may be easier to use for a person without extensive navigational training, have met with only limited success, presumably because voluminous tables may still be required, or because the instruments have been too complex, delicate, or difficult to operate, or because such instruments have for all practical purposes been limited to the sighting of select reference stars, such as the North Star.

References illustrative of the art are U.S. Pat. Nos. 2,566,312 (Cable), 2,316,466 (Storer), E. S. Maloney, *Dutton's Navigation* (Navel Institute Press, Anapolis, Md., 1978), and Bowditch, *The American Practical Navigator*.

SUMMARY

A main object of this invention is to provide an improved navigational instrument which is compact, highly portable, and does not require the user to be encumbered by plotting boards, volumes of sight reduction tables, and other bulky equipment and materials. Beside the instrument itself, all that is required are a timepiece and a sidereal almanac. While some writing surface and writing instrument are also needed, they may obviously take any of a variety of forms and, in any event, the size of the surface needed for calculations is minimal. For example, all of the sight reduction computations may easily be written on one or two sides of a sheet measuring no more than three inches by five inches.

The instrument of this invention allows the user to fix his position without the use of complex sight reduction procedures because all calculations are carried out in spherical coordinates. Conversion from spherical to rectangular coordinates is eliminated, along with the instruments of its application, such as bulky sight-reduction tables and plotting boards.

A further advantage of this instrument is that its use does not require an assumed position. Thus, shipwrecked persons possessing the instrument may readily determine their position even if they have no prior knowledge of their position, or if their information is wrong.

A further advantage of the instrument is that, since only simple arithmetic is used in sight reduction, little previous training is needed to learn its use, so that persons can learn to use it quickly, even under emergency circumstances.

The instrument has the further advantage of being relatively simple and durable in construction. Since it is completely optical-mechanical in construction, it may be ruined only if badly abused or severely corroded, in contrast to computer devices which may become useless as a result of power failure, slight corrosion, or extreme temperatures.

Another advantage of the instrument is that it may be used for sighting any two celestial objects visible in the sky, regardless of their angular separation. While no navigational instrument can give accurate position determinations from objects which are nearly 180° apart, the present instrument is subject to no more limitations of star placement than ordinary sextant navigation. The navigator is thus free to choose any celestial objects which are both bright and favorably placed in the sky. With appropriate filters, even celestial objects very different in magnitude, such as the sun and moon, may be used for position determinations. Furthermore, such instrument may be used equally well in the northern and southern hemispheres. When used in conjunction with a tripod and an artificial horizon device such as a bubble, it can even be used in polar regions, its accuracy being limited only by the accuracy of the artificial horizon device used with it.

Briefly, the instrument has an annular body with a pair of periscopes adjustably mounted at opposite ends of the body. Each periscope has a tubular axial portion which is coaxial with the body, a tubular arm portion having an axis extending radially from the central axis of the body, and a turret portion at the distal end of the arm portion. Each turret is adjustable and has a sight opening with a line of sight which sweeps about a plane parallel with the central axis of the instrument when the turret portion is rotated.

The annular body of the instrument includes a 360° scale extending circumferentially thereabout. Indicators are carried by the radial arms of the two periscopes to indicate the angular position of adjustment thereof with respect to the scale. Similar indicators and protractors are provided near the distal ends of the periscopes to indicate the angular positions of adjustment of the turret portions.

Mirrors and a beam-splitting element are mounted within the instrument to transmit images received by the sight openings of both periscopes to a viewing opening at the end of the axial portion of one of the periscopes. Thus, if the periscopes are first adjusted along the scale of the annular body into angular positions representing the Sidereal Hour Angles of two navigational reference objects in the celestial sphere, with the turrets adjusted into positions representing the Polar Distances of such objects, and such objects are then viewed in superimposition through the viewing opening of the instrument, the central axis of that instrument will extend towards a celestial pole.

Such instrument would be equipped or used with a device for measuring the angle of the instrument's central axis from the horizontal, such angle being representative of the latitude of the observer, and for determining the indicated angle of uppermost point (or 90° from such uppermost point) along the circumferential scale extending about the instrument's annular body. From such indicated angular position along the circumferential scale, the user knows his Local Hour Angle of Aries and, by referring to a sidereal almanac giving Greenwich Hour Angle of Aries for the moment of observation, the user may easily compute his longitude.

The device disclosed for use with the instrument to establish the angle of the instrument's central axis from the horizontal, and to locate the aforementioned indicated angle along the instrument's circumferential scale, takes the form of a telescope which has a viewing axis extending in a plane parallel with the instrument's central axis. The telescope includes a tubular body containing ocular and objective lenses and a tubular extension which projects at right angles from the body. A right-angle tubular connector adjustably connects the telescope extension to the instrument at the viewing opening thereof. Suitable mirrors are located within the connector and telescope to transmit images from the instrument's viewing opening to the telescope's ocular lens.

The image-transmitting mirror within the telescope is dimensioned and positioned so that a user, looking through the telescope's eyepiece, may view both of the reference stars and the horizon. The angular difference between the viewing axis of the telescope and the central axis of the instrument therefore represents the latitude of the observer. The angular difference between the orientation of the main body of the instrument and of the telescopic horizon observing portion of the instrument, is indicative of the observer's Local Hour Angle of Aries.

The telescope also includes an artificial horizon system which takes the form of a circular bubble chamber mounted within the barrel of the telescope, at the bottom or top thereof, and a mirror which reflects the image of the bubble device to the ocular of the telescope. When the viewer has adjusted the scope to center the bubble, the viewing axis of the scope will extend horizontally. In addition, the vertical orientation of the scope is necessarily fixed, and by means of a suitable indicator, the aforementioned indicated angular point along the circumferential scale of the instrument may be readily ascertained.

Other features, objects, and advantages of the invention will become apparent from the drawings and specification.

DRAWINGS

FIG. 5 is a semi-diagrammatic perspective view of the telescopic device attached to form a part of the instrument, the interior of the telescopic device being presented as if viewed through the eyepiece thereof.

FIG. 6 is a fragmentary perspective view illustrating one of the periscopes of the instrument equipped with a supplementary 45° reflector for simplifying the task of aligning the periscope with a reference star.

DETAILED DESCRIPTION

Figure 1:
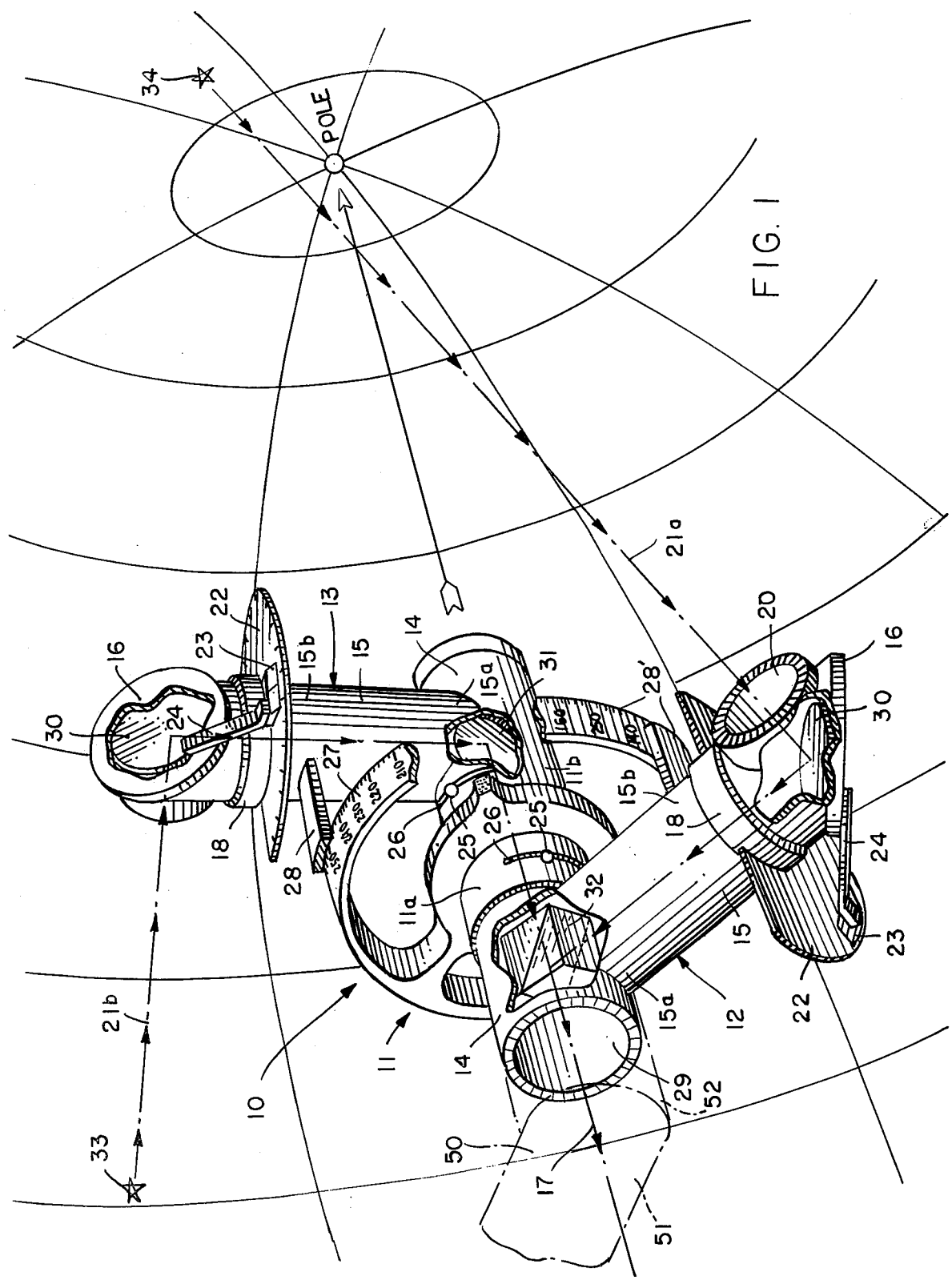
FIG. 1 is a perspective view of the basic structure of the instrument with portions thereof cut away to reveal internal components, the instrument being depicted at the center of the celestial sphere with its periscopes directed towards two reference stars and with its central axis directed at the local celestial pole.

Referring to FIG. 1, the numeral 10 generally designates a bi-periscopic instrument embodying the present invention, such instrument comprising an annular body 11 and a pair of periscopes 12 and 13. The two periscopes are similar in construction, each having a tubular axial portion 14 coaxial with body 11, a tubular arm portion 15, and a turret portion 16. The arm portion 15 of each periscope has its proximal end 15a secured to, and communicating with, axial portion 14 and is oriented to extend radially outwardly from that axial portion. The axis of each arm portion 15 is perpendicular to the central axis 17 of the instrument, as clearly shown in FIG. 1.

Each turret (or turret portion) 16 is rotatably mounted upon the distal end 15b of an arm (or arm portion) 15 for rotation about the longitudinal axis of that arm. In the illustration given, each arm has a collar 18 which receives a portion of the turret. Unintentional detachment may be prevented by any conventional means such as a split ring received in complementary channels formed in the opposing surfaces of the parts, and a friction screw or other conventional means (not shown) provides sufficient resistance to retain the turrets in their positions of adjustment until changes in such positions are desired. The turrets may be rotated by calibrated or uncalibrated worm gears or by any other suitable adjusting means as well known in the art.

Each turret 16 has a sight opening 20 which, in the form depicted in FIG. 1, faces in a direction at right angles to the axis of tubular arm 15. Consequently, the lines of sight 21a and 21b through the sight openings of periscopes 12 and 13 extend along planes parallel with the instrument's central axis 17.

The position of each turret 16 is indicated by a protractor 22 secured to arm 15 and by a suitable vernier 23 indexed to indicator member 24 attached to the turret. In the embodiment illustrated, each protractor covers an arc of 180° and is provided with suitable markings which, in combination with the vernier 23, indicate the angular position of adjustment of the turret.

The annular body 11 of the instrument includes sleeve portions 11a and 11b which rotatably receive opposing ends of axial portions 14 of periscopes 12 and 13. The parts may be locked or restrained against rotation by set screws 25 extending through slots 26, or by split rings and friction screws, or by calibrated or uncalibrated worm gears, or by any other suitable means.

The annular body 11 carries a 360° scale 27 about its periphery, the scale being indexed to the periscopes by indicators 28, 28' attached to periscope arms 15 and extending over the calibrations 27 of the 360° scale attached to the annular body.

Within the periscopes 12 and 13 is an arrangement of reflectors for transmitting images from the sight openings 20 to a viewing opening 29 at the outer end of the axial portion 14 of periscope 12. Specifically, each turret 16 has a mirror 30 fixed therein at an angle of 45° with respect to the axis of arm 15. Rotating a turret in its friction sleeve will cause the mirror to scan a narrow (approximately 2° to 6°) band of sky. Although each protractor 22 is shown to have a scale extending along an arc of 180°, it will be understood that such protractors may be extended to provide scales for measuring arcs of up to 360° if desired. The image reflected by the mirror 30 of periscope 13 is thus transmitted through arm 15 into the axial portion 14 of the periscope where it is further reflected by mirror 31 secured at 45° with respect to the axis of the arm and to the central axis 17 of the instrument. The reflected image passes through a partially silvered beam splitter 32 mounted with the axial portion 14 of periscope 12, the reflective face of the beam splitter being disposed at 45° with respect to the axis of the arm 15 of periscope 12 and to the central axis 17 of the instrument. Consequently, the images of objects in the lines of sight 21a and 21b of the periscopes are transmitted to the viewer through opening 29, such objects appearing in superimposed relation along the central axis 17 of the instrument.

In the use of the instrument, a navigator first selects two celestial bodies suitable for taking a sighting. The reference celestial objects, usually but not necessarily stars, may be any of a number of well known objects commonly used for navigational purposes. The navigator then assigns one of the periscopes to one reference celestial body and the other periscope to the other reference celestial body. Assignment of a specific periscope to a specific celestial body may depend on a number of factors, for example, the difference in light transmittance and reflectance by the beam splitter used to equalize brightness of celestial bodies having slightly different magnitude.

The navigator finds in a sidereal almanac the Sidereal Hour Angle (SHA) and declination for both reference bodies, and converts the latter to Polar Distance (PD) by substracting it from, or adding it to, 90°. Beginning with one periscope, the navigator then sets the arm of that periscope so that the arm's position, as indicated by scale 27, corresponds to the SHA of the celestial body assigned to that periscope. The navigator then sets the turret 16 of that periscope to the Polar Distance of the celestial body assigned to such periscope.

The same process is then repeated for the other periscope, such periscope being shifted into a position along scale 27 until its indicator corresponds to the SHA of the second reference body. Again, the turret 16 of the second periscope is rotated into a position indicated by vernier scale 23 and protractor 22 to represent the Polar Distance of the second reference body.

Since each periscope views only a small (about 2° to 6° diameter) region of the sky, the navigator chooses one celestial body to begin the sight and, looking through viewing opening 29, finds that body in the periscope assigned to it. The selected body is for illustrative purposes designated as star 33 in FIG. 1. The navigator then rotates the entire instrument around the line of sight 21b for that star until the other celestial body, designated as star 34, comes into view through the other periscope 12. When the images of the two stars coincide with each other and with the central axis of the instrument as indicated by the crossed hairs 61 (see FIG. 5), the central axis of the instrument will be pointed at the navigator's local celestial pole, the plane of the annular body 11 will be parallel to the plane of the earth's equator, and the zero marking of scale 27 will be pointed 90° away from Aries (the vernal equinox). Furthermore, when the instrument is oriented as so described, the navigator's Local Hour Angle of Aries (LHA) will correspond to a point on the scale 27 which lies 90° from the uppermost point of that scale.

When the instrument is aligned with the two stars 33 and 34, the navigator may easily determine his position at the surface of the earth by a two step procedure. Latitude is the angular elevation of the instrument's central axis 17, that is, the angle between axis 17 and the horizontal. Longitude is the difference between the navigator's Local Hour Angle of Aries and the Greenwich Hour Angle of Aries, found in the almanac by reference to a watch and calendar. The angle of elevation of the central axis 17 and the Local Hour Angle of Aries can be determined by comparing the orientation of the instrument to the orientation of the horizon, whether natural or artificial. One such horizon device, containing facilities for using both a natural and/or artificial horizon, and suitable for attachment to instrument 10 as a part thereof, is illustrated in FIGS. 2-5.

Figure 2:
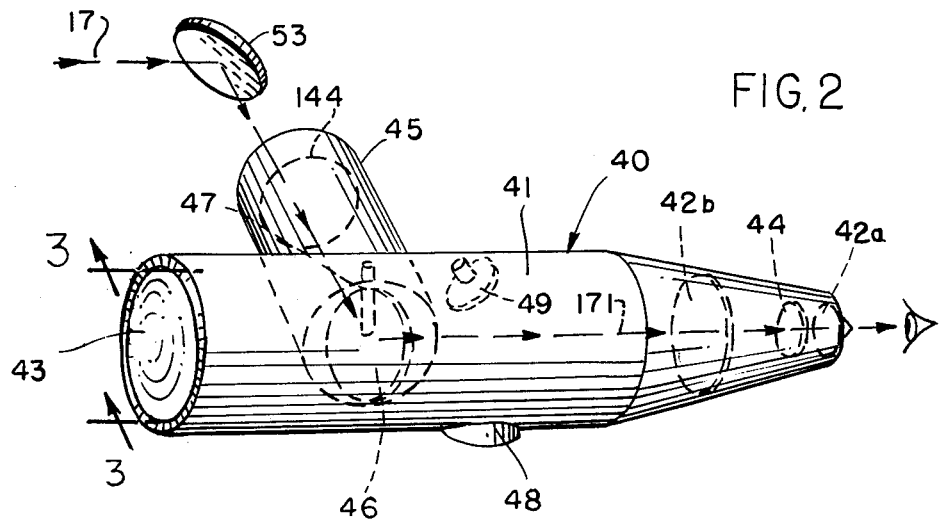
FIG. 2 is a perspective view of a telescopic device suitable for use as an addition to the instrument of FIG. 1.
Figure 3:
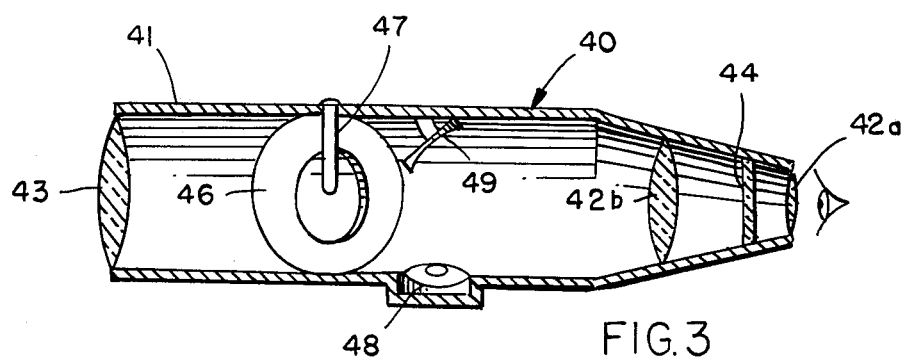
FIG. 3 is a vertical sectional view of the telescopic device taken along line 3—3 of FIG. 2.
Figure 4:
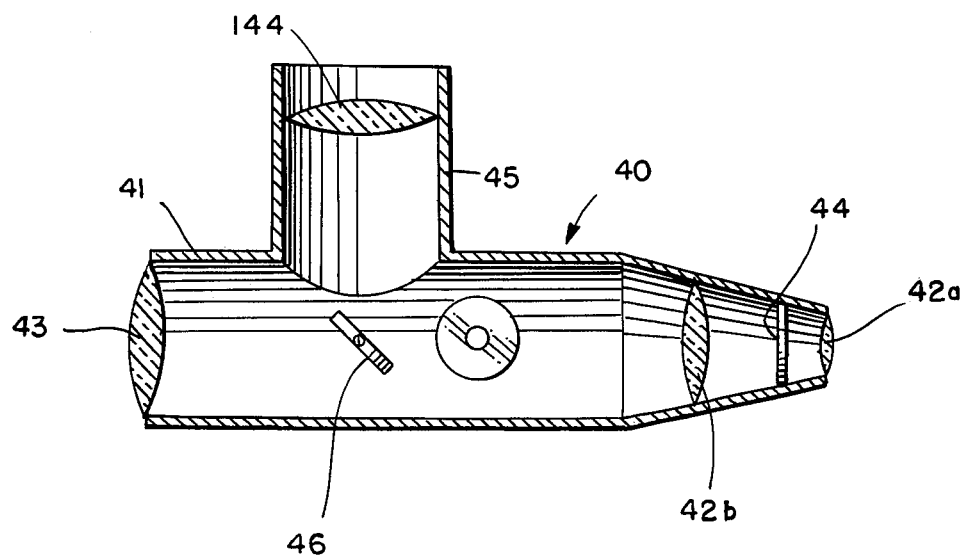
FIG. 4 is a horizontal sectional view of the telescopic device.

Referring to FIGS. 2-5, the horizon-viewing device takes the form of a low power telescope 40 having a tubular barrel 41 containing ocular lenses 42a and 42b and an objective lens 43. The ocular lens assembly also includes a reticle 44. A tubular extension 45 projects laterally (at right angles) from barrel 41 and also contains an objective lens 144. A mirror 46, preferably of elliptical shape as indicated in FIG. 2, is rigidly supported within the telescope barrel, at the intersection of the axes of barrel 41 and extension 45, by support shaft 47. It will be noted that the edges of mirror 46 are spaced substantially inwardly from the inside surface of tubular barrel 41 or, stated differently, that the mirror is dimensioned and positioned to define a substantial annular area about its periphery to permit viewing through that annular zone and through objective lens 43. The user may therefore view the natural horizon in the annular zone by properly aiming telescope 40 under conditions permitting observation of that horizon.

An artificial horizon or leveling device is also included within the telescope barrel. The device shown takes the form of a circular bubble level 48 mounted within the bottom of the telescope barrel although, if desired, the bubble level might be mounted at the top of the barrel. A user views the bubble through a concave diagonal mirror 49 mounted within the top portion of the barrel directly above the bubble device. The mirror reflects an image of the bubble device into the eye of the user and acts as the objective of a low power microscope of which the telescope ocular acts as the ocular. When the user sees the bubble centered in the circle of the bubble device, both the telescope barrel 41 and its tubular lateral extension 45 are horizontally disposed.

The horizon viewing device 40 is connected to the instrument 10 by an angular connector 50 (FIGS. 1 and 5) which includes a pair of sleeves 51 and 52 joined together at right angles. The free end portion of sleeve 51 rotatably and frictionally receives tubular extension 45, whereas the free end portion of the other sleeve 52 rotatably and frictionally receives the outer end portion of the axial tube 14 of periscope 12. By conventional means already mentioned and well known in the art, such parts may be secured against axial separation while permitting rotational adjustment (e.g., friction sleeves, set screws, split rings, worm gears, etc.).

The connector 50 contains a mirror 53 mounted at the junction of sleeves 51 and 52 and at 45° angles with respect to the axes of both such sleeves. As best seen in FIG. 2, by means of mirrors 53 and 46, the central axis 17 is parallel to viewing axis 171. As shown in FIG. 5, an annular flange or wheel 54 bearing a 360° scale 55 may be secured to the axial tube of periscope 12 and may be used in place of the scale 27 of the instrument's annular body 11 to determine the uppermost point (or an angular 90° from that uppermost point) along the latter scale. Indicator 56, carried by the connector 50, indexes to the scale 55 of member 54 as shown in FIG. 5. Instead of being fixed to the axial tube of the periscope 12, the flange or wheel 54 may be rotatable with respect to that tube, and the tube may be provided with a suitable indicator (not shown) for indexing its position relative to the flange.

A second member 57, marked with scale 58, is mounted upon sleeve 51 of the connector and indexes with indicator 59 attached to tubular extension 45 to indicate the angle of elevation of the instrument.

FIG. 5 is a partly schematic view to the extent that the viewing opening 60 of the telescope 40 is shown enlarged to reveal what a navigator would see if the instrument, with the horizon-viewing device 40 connected thereto, were held in operative position. Mirror 49 reflects the image of the bubble device 48, the bubble being shown in centered condition. Mirror 46 reflects superimposed stars 33 and 34. For the purpose of precisely orienting the instrument, reticle 44 is scribed with cross hairs 61, the superimposed stars 33 and 34 are positioned at the intersection of such cross hairs. The natural horizon 62 is visible in the annular zone beyond the outer limits of mirror 46 and is aligned with the horizontal cross hair. It is to be understood that while the telescope as shown reveals both the natural and artificial horizons, one or the other would be appropriate for purposes of properly orienting the horizon-viewing device 40 depending on whether the navigator is on land, at sea, or in the air. With the instrument as so adjusted, the navigator simply reads the elevation off of scale 58 and the Local Hour Angle of Aries off of scale 55. As already described, the angle of elevation is the navigator's latitude, and the Local Hour Angle of Aries, when compared with the Greenwich Hour Angle of Aries taken from the almanac, gives the navigator's latitude.

The reticle 44 not only has cross hairs 61 but also preferably includes height-of-eye markings 61a shown most clearly in FIG. 5. Such horizontal marks allow the viewer to compensate for the fact that his eye is spaced above the ground (or water) when the instrument is in use and, therefore, that the viewing axis would be inclined slightly from the horizontal when the telescope is pointed at the true horizon unless some appropriate adjustment were made. A plurality of markings 61a are provided for selective alignment with the horizon as shown, the particular marking so selected being determined by the user on the basis of his height and position with respect to the ground (or water).

Ocular and objective lenses 42 and 43, and reticle 44, are desirable because, among other things, they have the combined apparent effect of locating the cross hairs 61 (and height-of-eye markings 61a) at visual infinity. Such lenses and reticle might be omitted from the sighting tube 40; however, in that event some other means would have to be provided for supporting the cross hairs 61, preferably at the sight opening 20 of periscope 13 or at some other location on the instrument that is remote from the user's eye when the instrument is in use.

FIG. 6 shows one of the periscopes of the instrument equipped with a supplementary 45° reflector 130 for simplifying the visual work of aligning that periscope with its reference star. Turret 160, unlike turret 16, is mounted to rotate about an axis 161 perpendicular to the axis of arm 15. The line of sight 121 through sight opening 120 extends along a plane which parallels the central axis 17 of the instrument (as before) but, unlike the previous embodiment, the line of sight 121 also extends along a plane parallel with the axis of arm 15. Therefore, in the use of the instrument modified in accordance with FIG. 6, the navigator may find it easier to locate the reference star within the view opening or eyepiece of the instrument.

Both periscopes may be adapted as indicated in FIG. 6. When so adapted, each turret 160 is rotatably carried by the collar 118 of a lateral extension 200 of arm 15. A protractor 122 is mounted upon that extension and indexes with indicator 124. The indicator 124 includes a vernier scale 123 which rides along the scale of protractor 122. With the instrument equipped with turrets mounted as so indicated, the LHA will be the uppermost point on scale 27 rather than 90° from that uppermost point as in the first embodiment.

While in the foregoing, I have disclosed details of embodiments of my invention for purposes of illustration, it will be understood by those skilled in the art that many of these details may be varied without departing from the spirit and scope of the invention.

I claim:

1. An instrument for use in establishing terrestrial positions through celestial observation, comprising in operative combination:
    (a) an annular body having a central axis;
    (b) a first periscope having a tubular axial portion coaxial with said body and a tubular arm portion with an axis extending radially from said central axis, said arm portion having a proximal end secured to said axial portion and having said radial axis thereof perpendicular to said central axis;
    (c) a second periscope having a tubular axial portion coaxial with said body and a tubular arm portion with an axis extending radially from said central axis, said arm portion having a proximal end secured to said axial portion and having said radial axis thereof perpendicular to said central axis;
    (d) said tubular axial portions of said periscopes being adjustably mounted upon opposite ends of said annular body for independent relative rotation about said central axis;
    (e) each of said periscopes having rotatably mounted on a distal end thereof a turret having a sight opening;
    (f) each of said turrets having reflecting means fixed therewithin for transmitting images from said sight openings to said central axis;
    (g) one of said periscopes having a viewing opening for viewing along said central axis;
    (h) said annular body having a single 360° scale extending circumferentially thereabout;
    (i) indicator means disposed on each of said periscopes for indicating the angular position thereof along said scale and to indicate Local Hour Angle of Aries along said scale when said instrument is positioned for the viewing, in superimposed relation, a pair of celestial reference objects through said turret sight openings via said viewing opening; and
    (j) direct-line-of-sight horizon viewing means for indicating the angle of said central axis from horizontal disposed connected to said viewing opening of said periscope, which viewing means provides for a central superimposed image of said celestial reference objects sighted through said turrets and a view of said horizon alignable with said central superimposed image, said horizon view being disposed located in an annular zone around said central image of said celestial objects.

2. The instrument of claim 1 in which said horizon viewing means comprises a telescope having a viewing axis extending in a plane parallel with said central axis, said telescope including a tubular telescope barrel containing ocular and objective lenses and having a tubular extension projecting at right angles from said barrel; an angular tubular connector having first and second sleeve portions disposed at right angles with respect to each other, said first sleeve portion being axially aligned with and rotatably connected to said tubular extension, and said second sleeve portion being axially aligned with and rotatably connected to said axial portion of said one periscope at said viewing opening; and means within said connector and said telescope barrel for transmitting images from said viewing opening to said ocular lens.

3. The instrument of claim 2 in which said last-mentioned means includes a mirror disposed within said telescope barrel positioned and arranged to reflect images from said extension towards said ocular lens, said mirror having transverse dimensions substantially smaller than the inside cross sectional dimensions of the portion of said telescope body extending thereabout.

4. The instrument of claims 2 or 3 in which indicator means are provided by said extension and said connector for indicating the angular difference between the viewing axis of said telescope and said central axis of said device.

5. The instrument of claims 2 or 3 in which indicator means are provided for indicating the rotational position of said second sleeve relative to said instrument body.

6. The instrument of claim 2 in which circular bubble level means are disposed within said telescope barrel, said circular bubble indicating means being located along the bottom inside of said telescope barrel to indicate a level position when said barrel is oriented with said viewing axis aligned with the horizon; and mirror means disposed within said telescope barrel for reflecting the image of said circular bubble indicating means to said ocular lens, said image being disposed in said annular zone.

7. The instrument of claim 6 in which said mirror means is diametrically disposed within said telescope barrel with respect to said circular bubble indicating means.

8. The instrument of claim 1 in which indicating means are provided by each of said periscopes for indicating the angular relationship between the line of sight through the sight opening of said turret and said central axis of said instrument.

9. The instrument of claims 2, 6, and 8 in which said reflecting means includes a mirror rigidly secured within each of said turret portions at an angle disposed 45° relative to said radial axes of said arm portions.

* * * * *